ated Patent [19]

United States Patent [19]
Bowen et al.

[11] 4,186,996
[45] Feb. 5, 1980

[54] OPTIC ADAPTOR JUNCTION

[75] Inventors: Terry P. Bowen, Etters; Leonard F. Bendiksen, Harrisburg, both of Pa.

[73] Assignee: AMP Incorporated, Harrisburg, Pa.

[21] Appl. No.: 944,937

[22] Filed: Sep. 22, 1978

[51] Int. Cl.² .............................................. G02B 5/14
[52] U.S. Cl. .................................................. 350/96.20
[58] Field of Search ............... 350/96.20, 96.21, 96.22

[56] References Cited
U.S. PATENT DOCUMENTS

| | | | |
|---|---|---|---|
| 3,869,194 | 3/1975 | Shiraishi et al. | 350/96.30 |
| 3,878,397 | 4/1975 | Robb et al. | 350/96.20 |
| 3,948,582 | 4/1976 | Martin | 350/96.21 |
| 3,995,935 | 12/1976 | McCartney | 350/96.21 |
| 4,033,668 | 7/1977 | Presby | 350/96.21 |
| 4,065,203 | 12/1977 | Goell et al. | 350/96.20 |
| 4,076,376 | 2/1978 | Slaughter | 350/96.21 |
| 4,090,778 | 5/1978 | Phillips et al. | 350/96.20 |
| 4,118,105 | 10/1978 | Voigt | 350/96.20 |
| 4,119,363 | 10/1978 | Camlibel et al. | 350/96.20 |

Primary Examiner—Stewart J. Levy
Attorney, Agent, or Firm—Gerald K. Kita

[57] ABSTRACT

The disclosure relates to a connector subassembly which provides an optic adaptor junction for a waveguide or an optic transmission line, the connector having a short length of optic waveguide concentrically received within a diametrically resilient ferrule, with one end of the waveguide adapted for concentric alignment with the transmission line, and with the other end located within a cavity of the ferrule which mounts a photoactive section of an optical electronic device in precise coincident alignment with the waveguide.

6 Claims, 6 Drawing Figures

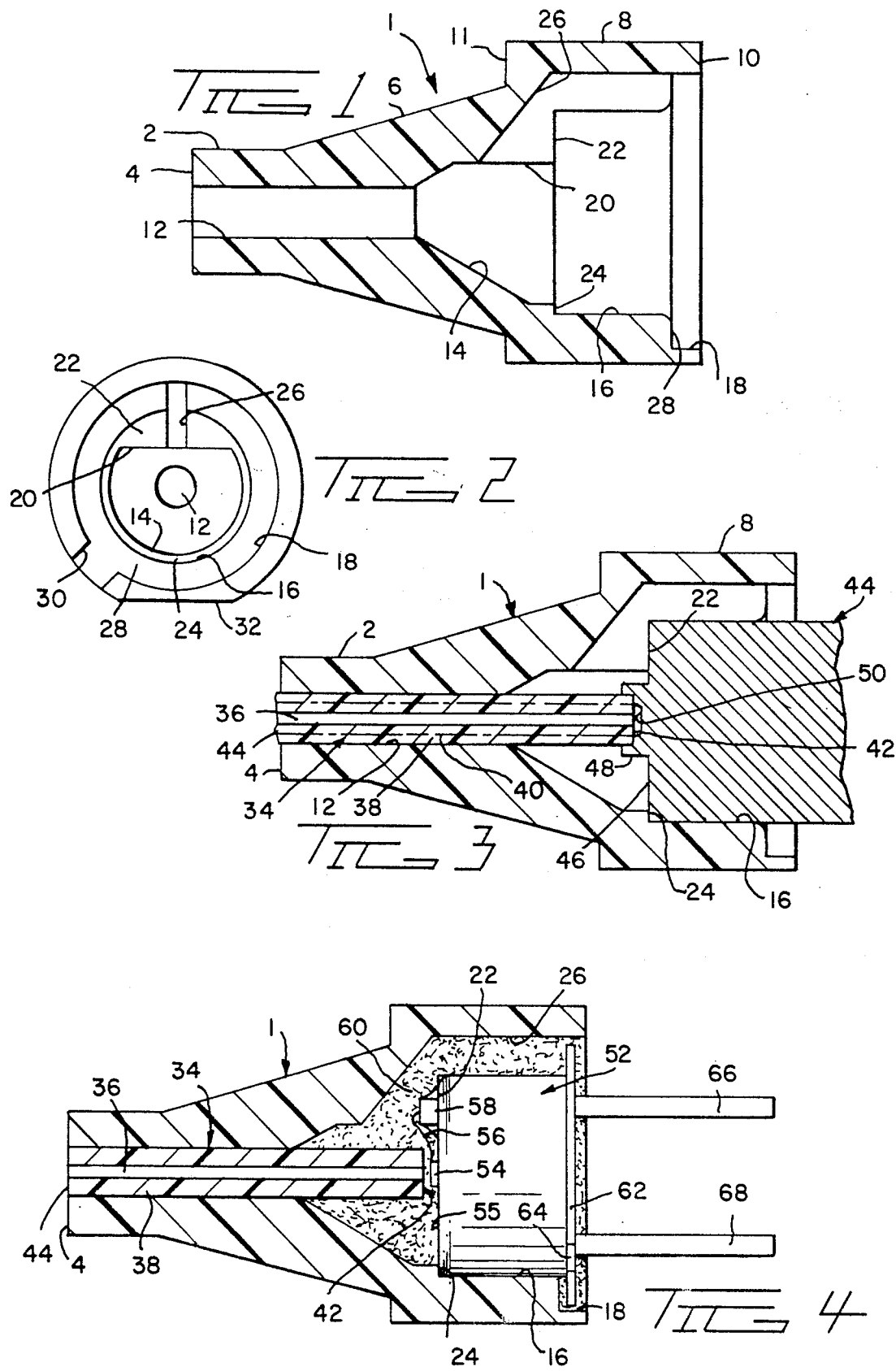

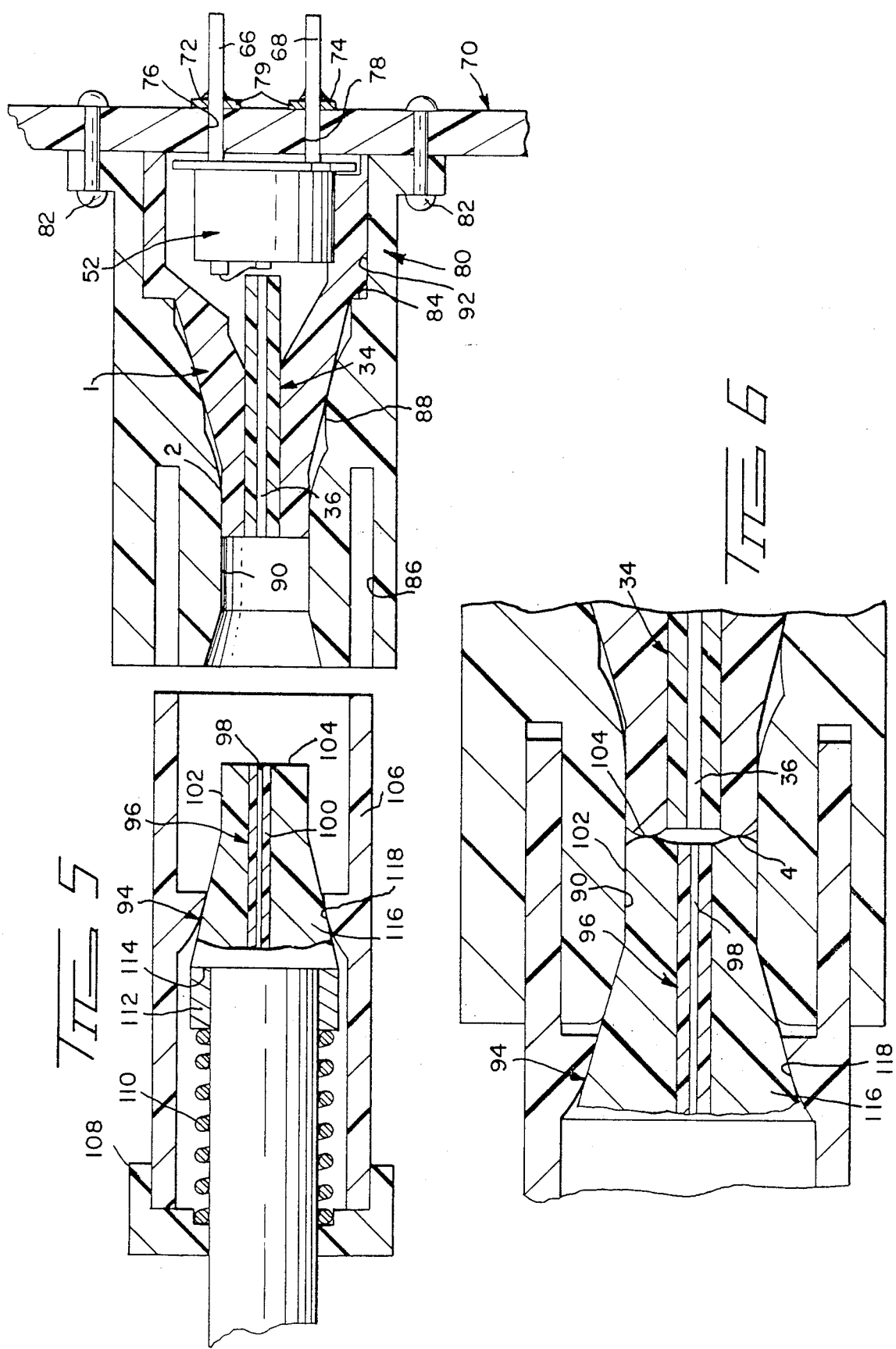

OPTIC ADAPTOR JUNCTION

BACKGROUND OF THE INVENTION

A connector for a light transmitting cable or transmission line is disclosed in U.S. Pat. No. 3,999,837 and includes a radially deformable resilient ferrule in which is secured the transmission line. The transmission line end is polished flush with the end of the ferrule. The ferrule is then inserted into one end of a sleeve form connector which radially deforms the ferrule, thereby causing the polished transmission line end to be biased to a stabilized position within the connector. When a second transmission line is provided with a corresponding ferrule and inserted into the other end of the connector, the second waveguide end will also be biased to a stabilized position within the connector and will be in coincident alignment with the first transmission line so that light signals may be transferred to one transmission line to the other with low attenuation.

Light signals are generated and received by various photoactive electronic circuit elements such as a photodiode, phototransistor or a light emitting diode. Connection of transmission lines to such circut devices has proven to be time consuming and difficult. Care must be taken to prevent damage to the circuit devices and to minimize attenuation. It has been difficult also to provide a connection to an optoelectronic device which may be readily disconnected.

BRIEF DESCRIPTION

A resilient ferrule is adapted for providing a compact coupling of a waveguide and optoelectronic circuit device, which coupling may be readily disconnected and which provides an optical junction between the waveguide and circuit device with minimum attenuation. The resilient ferrule comprises a portion of a subassembly of the ferrule and a length of optical waveguide. The outer diameter of the waveguide is concentrically enlarged by a build up of suitable material which is compatible with, or which may be the same as, that material which already forms the outer refractive cladding layer of the waveguide itself. The larger diameter assures concentricity of the waveguide core within the diameter of the encircling ferrule.

One end of the concentrically enlarged waveguide is polished. A suitable bonding agent is then applied to the enlarged surface of the waveguide or to the interior of the ferrule. The unpolished end of the waveguide is inserted into and along the ferrule interior until the polished end is suitably positioned within a cavity of the ferrule which is to receive the optoelectronic circuit device.

The ferrule and unpolished end of the waveguide are polished flush with each other to provide a waveguide and ferrule subassembly which provides an optical coupling element for an optoelectronic circuit device and an optic transmission line carrying optic signals to or from the circuit device.

OBJECTS

An object of the present invention is to provide a compact disconnect coupling for an optic transmission line and an optoelectronic circuit device.

Another object of the present invention is to provide a subassembly of an optic waveguide polished at both ends and contained concentrically within a radially deformable resilient ferrule having a cavity which mounts a photoactive section of an optoelectronic circuit device in precise coincident alignment with the waveguides.

Another object of the present invention is to provide a connector subassembly which provides an optic adaptor junction for a waveguide and an optic transmission line, the connector having a short length of optic waveguide concentrically received within the radially deformable, resilient ferrule, with one end of the waveguide adapted for concentric alignment with the transmission line, and with the other end located within a cavity of the ferrule which precisely mounts a photoactive portion of an optoelectronic circuit device in precise coincident alignment with the waveguide.

Another object of the present invention is to provide a coupling connector having a concentrically enlarged diameter, optic waveguide concentrically secured in a resilient ferrule which is adapted at one end for coupling the waveguide to an optic transmission line, and at the other end to an optoelectronic circuit device.

Other objects and many attendant advantages of the present invention will become apparent from the following detailed description taken in conjunction with the drawings.

DRAWINGS

FIG. 1 is an enlarged elevation in section of a molded resilient ferrule portion of a connector subassembly according to the present invention.

FIG. 2 is an elevation of the ferrule shown in FIG. 1.

FIG. 3 is an elevation in section similar to FIG. 1 illustrating a diametrically enlarged length of optic waveguide being positioned within a cavity of the ferrule by a gauge block.

FIG. 4 is an elevation in section similar to FIGS. 1 and 3 further illustrating an optoelectronic circuit device positioned in coincident alignment with the length of waveguide and encapsulated in place to provide an optical junction or adaptor for disengagably coupling a transmission line to the circuit device.

FIG. 5 is an enlarged elevation in section with parts in exploded configuration illustrating the details of a connector incorporating the adaptor as shown in FIG. 4 together with a circuit board and a transmission line.

FIG. 6 is a fragmentary elevation in section of the optical connection of the transmission line and the adaptor.

DETAILED DESCRIPTION

With more particular reference to FIGS. 1 and 2, a resilient ferrule, illustrated generally at 1, is an integral body of plastic material fabricated by molding, with a reduced diameter cylindrical portion 2 provided with a right cylindrical end face 4, a frustoconical section 6, and an enlarged diameter end section 8 having an end face 10. A radially projecting shoulder 11 is provided between the sections 6 and 8. The interior of the ferrule 1 is provided with a cylindrical bore 12 which is concentric with the section 2 and which communicates with the end face 4. The bore extends through at least a portion of the frustoconical section 6, communicating with a frustoconical cavity 14, which in turn, communicates with an enlarged, right cylindrical bore 16 having a shallow, right cylindrical counterbore 18 communicating with the end face 10.

The frustoconical cavity 14 is interrupted by a projecting planar projection 20 defining an enlarged shoulder 22 which joins an arcuate shoulder 24 defined at the junction of the frustoconical cavity 14 and the enlarged bore 16. A narrow and deeply recessed passageway 26 is provided in the projection 20 and in the enlarged cylindrical portion 8 of the ferrule. The passageway 26 communicates with the frustoconical cavity 14, the enlarged diameter bore 16, and the counterbore 18, and with the end face 10 of the ferrule for a purpose to be described. As shown in FIG. 2, the counterbore 18 provides an arcuate shoulder 28 encircling the enlarged bore 16. The shoulder 28 is coplanar with a bottom surface of a channel 30 projecting radially from the counterbore 18 for a purpose to be described. A flat recessed surface 32 is provided on the circumference of the enlarged diameter section 8 of the ferrule which assists in handling and orientation thereof.

The ferrule is fabricated from a plastics material such as any of the polyesters or polyphenylene sulfide which is relatively rigid yet is sufficiently resiliently deformable to allow radial compression of the reduced diameter portion 2 for a purpose to be described.

FIG. 3 illustrates a relatively short length of optical waveguide generally illustrated at 34 being assembled with a ferrule 1. One such waveguide is available from Galileo Electro Optics Company, Sturbridge, Mass., and is identified as a fiber rod. More particularly, the waveguide 34 includes an 8 mils. diameter light transmitting core 36 of glass or plastic material encircled by a cladding material having a suitable refractive index for containing transmitted optic signals within the core 36. Initially, the cladding material is relatively thin, on the order of 1 mils, providing an overall diameter of the waveguide 34 of about 10 mils. It has been found that the cladding material initially is not necessarily concentric with the core 36.

In the desired operation of the resilient ferrule 1, it is important that the core 36 be accurately concentric within the reduced diameter portion 2. Accordingly, it has been found necessary to replace or enlarge the cladding layer of the cable 34 by a build up of suitable cladding material to provide an enlarged overall waveguide diameter of 40 mils. When enlarging the cladding layer, a build up of the same cladding material of the waveguide is required. The composition of the cladding is available from the manufacturer from which the waveguide is commercially available. Alternatively, it may be desirable to remove the original cladding material from the core 36. This may be accomplished by use of a suitable solvent, the composition of which also is made available by the manufacturer of the waveguide. Once the core 36 is entirely free of cladding material, a build up of suitable commercially available cladding material is concentrically applied thereto.

As shown in FIG. 3, the desired waveguide 34 is one of which the outer cladding 38 has been concentrically enlarged to a 40 mil diameter by a build up of suitable cladding material. The diametrically enlarged waveguide 34 includes one end 42 which is first polished according to well known techniques to minimize signal attenuation at the end of the core 36. The opposite end 44 of the waveguide 34 remains unpolished. The cylindrical exterior of the waveguide 34, or the interior of the bore 12, is coated with a relatively thin layer of adhesive such as epoxy resin. The unprepared or unpolished end 44 of the waveguide 34 is then inserted into the enlarged diameter end 8 of the ferrule and along the bore 12 until it protrudes from the face 4. The waveguide 34 will then be intimately encircled by the ferrule.

A locating fixture 44 in the form of a generally cylindrical gauge block of metal or rigid plastic has an outer diameter which interfits within the enlarged diameter bore 16 of the ferrule. A flat face 46 of the fixture is seated against the shoulders 22 and 24 of the ferrule. The face 46 of the fixture is provided with a projecting boss 48 which is provided with a stepped diameter recess 50 which is received over the end 42 of the diametrically enlarged waveguide 34. With the waveguide seated in the stepped diameter recess 50, and with the fixture 44, in turn, seated against the shoulders 22 and 24 the waveguide is retained in position until the epoxy resin solidifies and secures or bonds the waveguide in place within the bore 12. It is noted that the stepped diameter recess 50 of the fixture engages the polished end 42 of the waveguide in order to precisely locate the same within the ferrule interior or cavity. The recess 50 further provides a clearance space between the polished end of the core 36 and the fixture 44 to prevent abrasion and consequent damage. Damage to the polished end of the core 36 further is avoided by suspending the waveguide end 42 freely within the cavity. Any contaminants or residual epoxy resin on the interior surfaces of the ferrule are isolated by the free space surrounding the polished end of the core 36. It has been found that the act of inserting the waveguide 34 within the ferrule bore 12 will distribute the unsolidified epoxy resin evenly along the length of the bore 12. Epoxy residue may accumulate at the unpolished end 44 of the waveguide. Further contamination in the form of dust or shavings, produced by abrasion between the waveguide and the interior of the ferrule, may accumulate on the end 44 of the waveguide. The polished end 42 of the waveguide, however, is isolated from such contaminants. When the waveguide 34 is secured within the ferrule, the unpolished end 44 is then polished flush with the face 4 of the ferrule, which removes any contaminants and substantially prevents signal attenuation at the end of the core 36. What results is a subassembly of a concentrically enlarged length of waveguide having polished ends precisely positioned within a ferrule having an interior cavity which is suitable for mounting an optoelectronic circuit device. Such a device has been shown in the form of a can 52 having electrical leads which need to be oriented to effect a correct connection of the leads in a circuit. The tab 64 orients the can, and thereby its leads, with respect to the ferrule. The flat 32 on the ferrule then becomes the orienting feature for the ferrule, thereby also orienting the can and its leads for correct connection of the leads in a circuit.

It is important that the ratio of the diametrically enlarged waveguide 34 as compared with the outer diameter of the cylindrical portion 2 of the ferrule is to be selected sufficiently high so that concentricity of the core 36 and the outer diameter of the ferrule section 2 is accurately maintained.

FIG. 4 illustrates one use of the subassembly of FIG. 3 providing a header package for a standard TO-18 can, shown generally at 52, itself a container or package for electronic circuitry which includes a photoactive circuit element indicated at 54. In the typical case, the element 54 is mounted on the conductive end 55 of the can 52, and is connected with a conductive lead 56 to an electrically ground land 58 also protruding from an end 55 of the can. The can 52 is of a standard diameter and interfits within the ferrule bore 16. The end 55 of the can is seated against the shoulders 22 and 24 so that the element 54 is precisely located in coincident alignment with the end of the waveguide core 36. Thus, the shoulders 22 and 24 are utilized to preposition the end 42 of the waveguide 34 and also to position the element 54 within the interior or cavity of the ferrule 1. The can 52 is, therefore, pluggably received in the ferrule to result in a good optical junction between the element 54 and the waveguide 34. If a permanent mounting of the can 52 is desired, a quantity of epoxy resin 60 is deposited within the ferrule cavity prior to pluggably inserting the can as described. Upon solidification of the resin, the can will be permanently bonded or secured at the desired position as shown in FIG. 5. The resin 60 further will bond the end 42 of the waveguide to the element 54. Before solidification, some of the resin will be displaced by the can 52. Excess resin will then escape through and along the passageway 26 leaving behind sufficient resin to encapsulate and fill the free space within the ferrule interior. The counterbore 18 is allowed to fill with resin in order to encapsulate a radially projecting flange 62 of the can. As the resin solidifies, some shrinkage may occur; and additional quantities of resin may be added to fill the counterbore 18. On the flange 62 of some cans a radially projecting tab 64 is sometimes provided, which is used to polarize or otherwise orient the can. The tab 64 will interfit within the recess 30 of the ferrule shown in FIG. 2. Further as shown in FIG. 5, electrical leads 66 and 68 project outwardly of the can 52 and comprise input and output leads for the electronic circuitry contained in the can. Typically, the lead 68 is integral with the conductive end 55 of the can 52. The lead 66 extends entirely through the can and protrudes from the end 55 of the can to comprise the lead 58. The conductive end 55 of the can has an enlarged hole (not shown) through which the lead 66 projects without touching the conductive end 55. The can is filled with insulative epoxy resin which encapsulates and holds the lead 66 in fixed position. The epoxy resin in the counterbore 18 further encircles the leads 66 and 68 and, thereby, sealably encapsulates the can within the ferrule.

FIG. 5 illustrates a connector assembly utilizing the subassemblies of FIG. 4 and the can 52 of FIG. 5. More particularly, a typical printed circuit board 70 having electrical circuit paths 72 and 74 thereon includes apertures 76 and 78 passing through the circuit paths 72 and 74. A can 52 has its electrical leads 66 and 68 passing through the apertures and electrically connected, such as by solder filets 79, to the corresponding circuit paths 72 and 74. When it is desired to couple an optic cable to the can 52, a cylindrical connector block 80 is secured by fasteners 82 to the circuit board. A radially projecting lip 84 of the circuit block 80 overlies the exterior shoulder 11 of the ferrule 1, retaining the same against the circuit board 70. The front end 86 of the connector shell is of concentric sleeve construction. A frustoconical section 88, between a reduced diameter sleeve form portion 90 and an enlarged diameter portion 92, provides radial compression of the ferrule 1 when received in the connector shell portion 80.

As shown in FIGS. 5 and 6, the reduced diameter portion 2 of the ferrule 1 is compressibly interfitted within a portion of the sleeve portion 90. Radial compression of the sleeve portion 90 on the ferrule portion 2 causes resilient radial deformation thereof which biases the waveguide 34 to a stable position within the sleeve portion 90. Another resilient ferrule 94 is secured to an end portion of an optic transmission line 96 having a central core 98 and an outer cladding layer 100. A cylindrical portion 102 of the ferrule 94 is inserted compressibly within the sleeve portion 90. The resilient radial deformation of the ferrule portion 102 will bias the core 98 of the transmission line 96 to a stable position within the sleeve 90. In so doing, the cores 98 and 36 will be in coincident alignment, although not necessarily exactly concentric with the sleeve 90. It has been found that radial compression of two similar resilient ferrules within a common sleeve will bias corresponding optical cores into coincident alignment, even though the cladding layers are of different diameters, as shown in FIGS. 5 and 6. In addition, radial compression of each ferrule portion 102 and 2 will cause a small amount of bulging of the ferrule material at their faces 4 and 104. Thus, although previously polished to a planar configuration, the bulging faces 4 and 104 will engage each other and provide a slight separation between the aligned cores 36 and 98 to prevent abrasion of their polished ends against each other. The ferrule 94 is contained within an outer sleeve form shell 106, which concentricallly interfits in the space between the double sleeve form 86 of the connector 80. An end cap 108 encircles the transmission line and is assembled on the end of the connector portion 106. The cap 108 axially compresses a coil spring 110 which resiliently urges a thrust ring 112 against a shoulder 114 of the ferrule 104, causing the ferrule frusto-conical portion 116 to seat against a tapered projection 118 of the sleeve 106.

Although preferred embodiments of the present invention are shown and described in detail, other modifications and embodiments are intended to be covered by the spirit and scope of the appended claims.

What is claimed is:

1. A coupling connector for connecting between an optic waveguide transmission line and an optoelectronic circuit device, comprising:

a ferrule of resilient material provided with a cylindrical end having a concentric bore therein, an opposite end of said ferrule provided with a cavity communicating with said bore and being adapted for receiving an optoelectronic circuit element, a length of optic waveguide mounted in said bore and having a polished first end substantially flush with said cylindrical end of said ferrule, a polished second end of said waveguide projecting into said cavity at a precise location within said cavity, first means for seating and positioning an optoelectronic circuit element at a precise location in said cavity, and second means for bonding said optoelectronic device and said waveguide in said bore .

2. The structure as recited in claim 1, wherein said second polished end of said waveguide is suspended in free space within said cavity to avoid contamination thereof.

3. The structure as recited in claim 1, and further including:

light transmitting encapsulant material along said cavity, said material being solidifiable and joining said waveguide and said optoelectronic device, said optoelectronic device including electrical leads protruding from said encapsulant material, a drainage passageway communicating with a portion of said cavity containing said second polished end of said waveguide and with an open end of said ferrule for draining excess encapsulant material from said cavity prior to solidification.

4. The structure as recited in claim 1, and further including:
 a package for containing electronic circuitry being provided at one end with a photoactive circuit element and at the other end of protruding electrical leads,
 said package being seated within said cavity to position said photoactive element in coincidental alignment with an end of said waveguide,
 a quantity of solidifiable encapsulant material within said cavity sealably enclosing said package, with said electrical leads protruding outwardly of said encapsulant material and said ferrule.

5. The structure as recited in claim 1, and further including:
 third means for orienting an optoelectronic device in said ferrule, and
 fourth means for orienting said ferrule.

6. A method for assembling a coupling connector for connecting between an optic transmission line and an optoelectronic circuit device comprising the steps of:
 diametrically enlarging a length of waveguides by a build up of cladding material concentric with a light transmitting core of said waveguide,
 polishing one end of said diametrically enlarged waveguide,
 inserting the unpolished end of said diametrically enlarged waveguide into and along a concentric bore of a radially resiliently deformable ferrule,
 securing said waveguide in said ferrule,
 polishing the second end of said waveguide flush with an end of said ferrule,
 seating an electronic circuit package within a cavity of said ferrule with a photoreactive circuit element of said package in coincident alignment with a polished end of said diametrically enlarged waveguide,
 encapsulating said package and said waveguide within a cavity of said ferrule.

* * * * *